United States Patent Office 3,335,193
Patented Aug. 8, 1967

3,335,193
SYNTHESIS OF ADAMANTANE DERIVATIVES
George A. Olah, Wellesley, Mass., assignor to The Dow Chemical Company, Midland, Mich., a corporation of Delaware
No Drawing. Filed Dec. 28, 1964, Ser. No. 421,670
6 Claims. (Cl. 260—648)

The present invention relates to a new chemical process, or more particularly, to an improvement which extends the utility of a known process.

It has been discovered recently (see Schleyer et al., J. Am. Chem. Soc., 82, 4645 (1960)) that tetrahydrodicyclopentadiene (hexahydro-4,7-methanoindane) and its lower alkyl derivatives are converted to the corresponding adamantanes when contacted with an aluminum halide catalyst at moderate temperatures. This method offers a route to hitherto scarce compounds containing the adamantane nucleus. However, some substituted adamantanes are not obtainable by this process. For example, halotetrahydrodicyclopentadienes which would be expected to give the adamantyl halides on rearrangement are found to yield no such product when treated with aluminum chloride in the usual way. These adamantyl halides are valuable intermediates for making 1-adamantol, 1-adamantylamine, and other derivatives having antimicrobial and other similar biological properties which previously have had to be prepared by less direct means with consequent loss of efficiency and convenience. Representative of such derivatives are 1-adamantyl substituted amines and 1-adamantyloxy or 1-adamantylthio derivatives of penicillin.

It has now been found that such 1-adamantyl halides can be prepared successfully by rearrangement when an aluminum halide is employed as a complex with a nitro lower alkane. This aluminum halide-nitroalkane complex has a specific activity different from that of the unmodified halide. The rearrangement of the substituted tetrahydrodicyclopentadiene proceeds smoothly under moderate reaction conditions to give good yields of the corresponding 1-adamantyl derivative. The catalyst complex is represented by the formula $$AlX_3 \cdot C_nH_{2n+1}NO_2$$

where X is halogen, usually chlorine or bromine, and $n$ is 1–4. Although this formula shows a 1:1 molecular combination, the nitroalkane is best used in considerable excess so that it serves as the reaction solvent. Mixed nitroalkanes of the formula shown may be used.

This improved process is effective in rearranging halogenated tetrahydrodicyclopentadienes of the formula

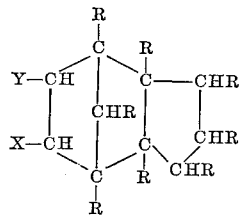

wherein X is halogen, Y is hydrogen, halogen, or alkyl of 1–2 carbon atoms, and each R is hydrogen or alkyl of 1–2 carbon atoms. The adamantane product thereby obtained has the formula

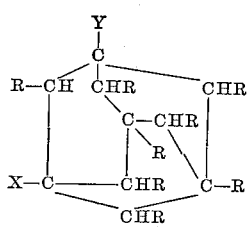

where X and Y are attached in the 1 and 3 positions on "bridgehead" carbon atoms as shown.

The halogenated tetrahydrodicyclopentadiene starting materials whose general formula appears above are easily made from the readily available dicyclopentadiene or its alkyl substituted derivatives by adding a molecule of hydrogen halide or of halogen to one double bond in the dicyclopentadiene molecule and hydrogenating the other double bond by conventional methods.

The quantity of aluminum halide employed in the reaction can be any quantity conventionally used in aluminum halide-catalyzed rearrangements. While that quantity can vary from about 0.5% by weight of the starting compound to an equal weight or even more, the proportion of aluminum halide is preferably about 5–25% by weight.

The rearrangement proceeds satisfactorily at moderate temperatures within the approximate range of —50° C. to 150° C. Higher temperatures cause excessive decomposition and side reactions. The process is usually best operated at 0–100° C. Reaction times of 0.1–10 hours are ordinarily sufficient to obtain optimum results.

The separation of the substituted adamantane product from the reaction mixture offers no unusual problems. After removal of the aluminum halide catalyst and, preferably, at least some of the nitroalkane, for example, by water washing and evaporation or distillation, the adamantane product can be separated from the remainder of the reaction mixture by conventional means such as extraction or distillation under reduced pressure. A particularly effective means is fractional crystillization.

*Example 1*

A solution of 0.5 g. of aluminum chloride in 20 ml. of nitromethane was added to 5 g. of 5-chloro-3a, 4,5,6,7,7a-hexahydro-4,7-methanoindane in 40 ml. of nitromethane, producing an orange-yellow solution. This solution was heated at reflux temperature for one hour, then cooled, washed free of acid with water, and dried. The organic chloride present was found to consist of 31% of 1-chloroadamantane and 69% unchanged starting material. The solvent was distilled from the solution and the 1-chloroadamantane was isolated by crystallizing it from the residue.

*Example 2*

By the procedure of Example 1, 1-bromoadamantane was obtained in similar yield by refluxing a solution of 5-bromo-3a,4,5,6,7,7a-hexahydro-4,7-methanoindane in nitromethane containing about 1% of anhydrous alumi-

Example 3

In the same way, 1-chloro-3-methyladamantane was prepared by heating at reflux temperature a solution of 5-chloro-6-methyl-3a,4,5,6,7,7a-hexahydro-4,7 - methanoindane in nitromethane containing a little aluminum chloride.

In the manner illustrated by the above examples, 5,6-dibromohexahydro-4,7-methanoindane is heated with a catalytic quantity of aluminum bromide in nitroethane solution to produce 1,3 - dibromoadamantane, 5 - fluorohexahydro-4,7-methanoindane is reacted in nitropropane solution with aluminum chloride to give 1-fluoroadamantane, 5-iodohexahydro-4,7-methanoindane and aluminum iodide are stirred in nitromethane solution to form 1-iodoadamantane, and 5 - bromo - 6-chlorohexahydro-4,7-methanoindane (from the addition of a mole of BrCl to dicyclopentadiene and hydrogenation of the product) is reacted with aluminum chloride in nitromethane solution to obtain 1-chloro-3-bromoadamantane.

I claim:

1. A process for making a 1-adamantyl halide which comprises reacting by contacting at about —50° C. to about 150° C. an effective amount of an aluminum halide in a nitro lower alkane with a compound of the formula

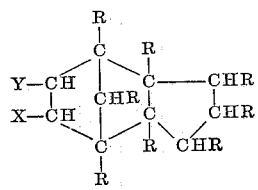

wherein X is halogen, Y is selected from the group consisting of hydrogen, halogen, and alkyl of 1–2 carbon atoms, and each R is selected from the group consisting of hydrogen and alkyl of 1–2 carbon atoms.

2. The process of claim 1 wherein each R is hydrogen, X is halogen, and Y is hydrogen.
3. The process of claim 2 wherein X is chlorine.
4. The process of claim 2 wherein X is bromine.
5. The process of claim 1 wherein X is halogen and Y is alkyl of 1–2 carbon atoms.
6. The process of claim 5 wherein X is chlorine and Y is methyl.

References Cited

Olah: "Friedel Crafts and Related Reactions," pages 246 and 299 (1963).

LEON ZITVER, *Primary Examiner.*

M. M. JACOB, *Assistant Examiner.*